(12) United States Patent
Botting

(10) Patent No.: US 8,220,583 B2
(45) Date of Patent: Jul. 17, 2012

(54) ACOUSTIC ISOLATOR SECTION

(75) Inventor: Philip Botting, Ruddington (GB)

(73) Assignee: Reeves Wireline Technologies Limited, Leicestershire (GB)

( * ) Notice: Subject to any disclaimer, the term of this patent is extended or adjusted under 35 U.S.C. 154(b) by 872 days.

(21) Appl. No.: 11/944,235

(22) Filed: Nov. 21, 2007

(65) Prior Publication Data

US 2008/0149415 A1 Jun. 26, 2008

(30) Foreign Application Priority Data

Nov. 23, 2006 (GB) .................................. 0623343.1

(51) Int. Cl.
*G01V 1/40* (2006.01)
(52) U.S. Cl. ......................... 181/102; 181/106; 181/108
(58) Field of Classification Search .................. 181/102, 181/104, 106, 108
See application file for complete search history.

(56) References Cited

U.S. PATENT DOCUMENTS

| | | | | |
|---|---|---|---|---|
| 3,191,141 A * | 6/1965 | Schuster | ......................... | 367/25 |
| 3,381,267 A * | 4/1968 | Cubberly, Jr. et al. | ........ | 367/189 |
| 4,446,539 A | 5/1984 | von Bose | | |
| 4,872,526 A | 10/1989 | Wignall et al. | | |
| 5,036,945 A | 8/1991 | Hoyle et al. | | |
| 5,510,582 A | 4/1996 | Birchak et al. | | |
| 5,728,978 A * | 3/1998 | Roberts et al. | ................. | 181/102 |
| 6,494,288 B1 * | 12/2002 | Tashiro et al. | ................. | 181/102 |
| 6,588,267 B1 * | 7/2003 | Bradley | ..................... | 73/152.47 |
| 6,739,423 B2 * | 5/2004 | Tashiro et al. | ................. | 181/105 |
| 2003/0024761 A1 * | 2/2003 | Tashiro et al. | ................. | 181/105 |
| 2005/0034858 A1 * | 2/2005 | Redding et al. | ............ | 166/254.2 |
| 2005/0152219 A1 | 7/2005 | Garcia-Osuna et al. | | |
| 2005/0167101 A1 | 8/2005 | Sugiyama | | |

FOREIGN PATENT DOCUMENTS

| | | |
|---|---|---|
| GB | 2382857 | 6/2003 |
| WO | 0075694 A1 | 12/2000 |
| WO | 0241034 A1 | 5/2002 |
| WO | 2005076040 A1 | 8/2005 |
| WO | 2006014272 A1 | 2/2006 |

OTHER PUBLICATIONS

Stephen Jennings, Patents Act 1977: Search Report under Section 17(5), Mar. 2, 2007, 3 pages,The Patent Office, UK.
UK Intellectual Property Office (Michael Warren), Patents Act 1977: Examination Report under Section 18(3), Oct. 22, 2010, 3 pages, UKIPO, Newport, South Wales, UK.

* cited by examiner

*Primary Examiner* — Jeremy Luks
(74) *Attorney, Agent, or Firm* — Mark A. Oathout; Oathout Law Firm

(57) ABSTRACT

An acoustic isolator section for an acoustic well logging tool, the isolator section comprising:
an isolator comprising:
(i) an isolator body;
(ii) a mass;
(iii) a resiliently deformable portion formed integrally with the isolator body;
(iv) a movement limiter.

22 Claims, 8 Drawing Sheets

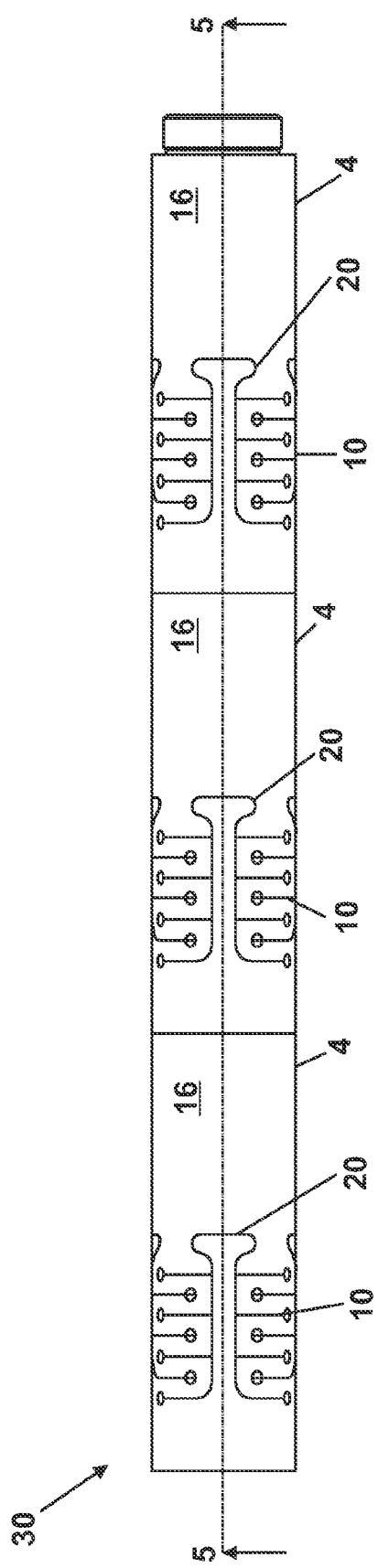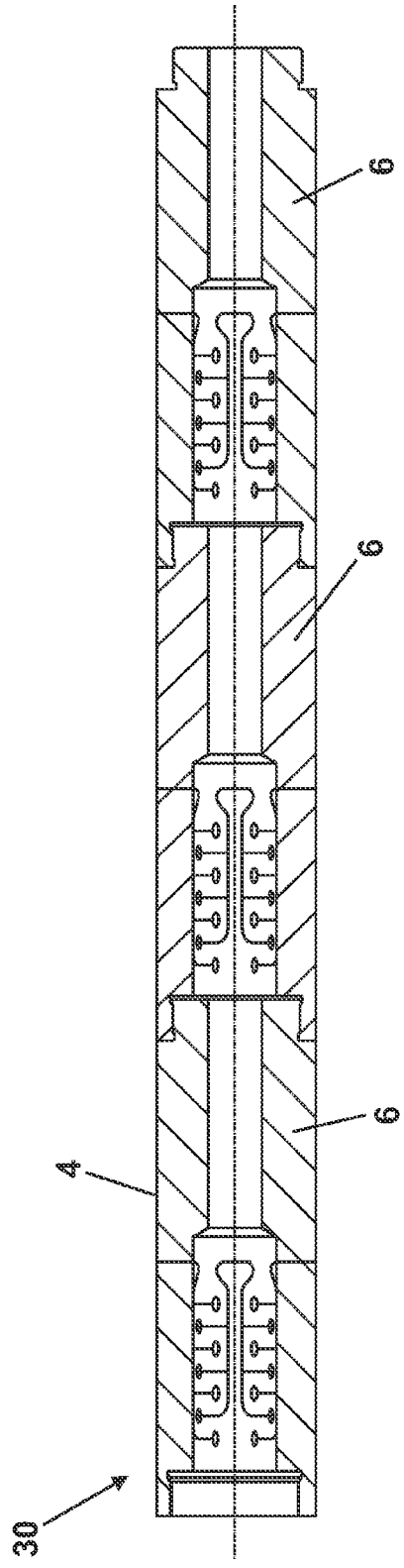

ACOUSTIC ISOLATOR SECTION

This application claims the foreign priority of GB patent application number 0623343.1 filed Nov. 23, 2006.

This invention relates to an acoustic isolator for an acoustic well logging tool, to an isolator section comprising one or more isolators, and to an acoustic well logging tool, incorporating such an isolator section. The invention relates particularly, but not exclusively, to a dipole acoustic well logging tool, and an acoustic isolator or isolator section forming part of such a logging tool.

It is known that acoustic well logging tools are used in oil and gas well bores, and usually comprise a cylindrically shaped tubular body which is appropriately dimensioned to allow passage of the tool through a fluid filled well bore. Such a tool is usually suspended in a well bore and incorporates several acoustic transducers. At least one of the transducers acts as a transmitter to generate acoustic signals which are to be detected by one or more receiving transducers.

Typically, the tool comprises a transmitter section comprising one or more transmitters, and a receiver section comprising one or more receivers.

It is known in the Oil and gas industries to log characteristics of a geological formation by measuring the time it takes for an acoustic pulse to travel a fixed distance through the formation.

In this respect, it is known to electrically activate a transmitter periodically to emit pulses of acoustic energy (or pressure waves) which propagate outwardly from the transmitter with a velocity dependent upon the media through which the acoustic energy passes. The acoustic energy or pressure waves may be in the form of either compressional wave energy or shear wave energy.

It is known to use a dipole acoustic transmitter to transmit dipole signals through the formation surrounding the borehole in which the logging tool is positioned. In such a logging tool, sound waves of approximately 2 kHz are generated by the transmitter, and travel via the borehole fluid to excite the surrounding rock formation. Information relating to the nature of the formation surrounding the bore hole may be obtained by determining time taken for acoustic waves to travel through a formation.

The acoustic signal generated by a transmitter of a well logging tool may be of a symmetrical or asymmetrical compressional wave form with respect to the bore hole axis. By processing wave forms that are received by one or more receivers after the acoustic energy has travelled through the formation surrounding the bore hole, the viscoelastic properties of the formation surrounding the bore hole can be detected. In particular, by determining the amplitude and phase relationship of acoustic waves as a function of time and distance the compressional and shear wave speeds of earth formations may be calculated.

In order to obtain an accurate measurement of the time taken for an acoustic wave to travel through formations surrounding the boreholes, it is desirable that the signals generated by the transmitter travel to the receiver of the tool via the formation.

A problem with known acoustic logging tools is that some of the energy from the transmitted acoustic signal travels along the tool due to the reaction force from the transmitter on the tool body. This can result in the signal from the formation being swamped, thus preventing accurate readings being taken.

It is known to incorporate an acoustic isolator, or attenuator, into such an acoustic logging tool. An acoustic isolator is intended to prevent energy from propagating along the tool, and at the same time to mechanically connect the transmitter to the receiver. This means that the isolator must have sufficient strength and stiffness to allow the tool to be deployed in a borehole, but also must prevent or reduce transmission along the tool of acoustic energy within the frequency range of interest It is known to use a mass-spring mechanical filter to attenuate wave propagation along acoustic logging tools. A mass-spring mechanical filter will typically comprise a plurality of masses inter-connected by a plurality of springs. In order to function in a well logging tool, the mass-spring mechanical filter must have high strength in order to withstand the conditions existing in well logging tool environments. The spring stiffness must be low to prevent transmission of acoustic energy within the frequency range of interest along the tool. A problem with known filters of this type is that in order to achieve sufficiently low spring stiffness, the strength of the isolator is often not sufficient for use in a well logging tool.

According to a first aspect of the present invention there is provided an acoustic isolator section for an acoustic well logging tool, the isolator section comprising an isolator comprising:
  (i) an isolator body;
  (ii) a mass;
  (iii) a resiliently deformable portion formed integrally with the isolator body;
  (iv) a movement limiter,
  wherein each resiliently deformable portion comprises a plurality of apertures and at least one first slot formed in the or each isolator body, which first slot is connected to one or more of the plurality of apertures.

According to a second aspect of the present invention there is provided an acoustic isolator section for an acoustic well logging tool, the isolator section comprising an isolator comprising:
  (i) an isolator body;
  (ii) a mass;
  (iii) a resiliently deformable portion;
  (iv) a movement limiter formed integrally with the isolator body,
  wherein each resiliently deformable portion comprises a plurality of apertures and at least one first slot formed in the or each isolator body. which first slot is connected to one or more of the plurality of apertures.

According to a third aspect of the present invention there is provided an acoustic isolator section for an acoustic well logging tool, the isolator section comprising an isolator comprising:
  (i) an isolator body;
  (ii) a mass;
  (iii) a resiliently deformable portion formed in the isolator body; and
  (iv) a movement limiter formed integrally with the resiliently deformable portion,
  wherein each resiliently deformable portion comprises a plurality of apertures and at least one first slot formed in the or each isolator body. which first slot is connected to one or more of the plurality of apertures.

According to a fourth aspect of the present invention there is provided an acoustic well logging tool comprising;
  a transmitter section;
  a receiver section spaced apart from the transmitter, and
  an acoustic isolator section comprising:
    an isolator comprising:
      (i) an isolator body;
      (ii) a mass;

(iii) a resiliently deformable portion formed integrally with the isolator body; and (iv) a movement limiter, wherein each resiliently deformable portion comprises a plurality of apertures and at least one first slot formed in the or each isolator body, which first slot is connected to one or more of the plurality of apertures.

According to a fifth aspect of the present invention there is provided an acoustic well logging tool comprising;

a transmitter section;

a receiver section spaced apart from the transmitter section, and an acoustic isolator section comprising:

an isolator comprising:

(i) an isolator body;

(ii) a mass;

(iii) a resiliently deformable portion; and (iv) a movement limiter formed integrally with the isolator body, wherein each resiliently deformable portion comprises a plurality of apertures and at least one first slot formed in the or each isolator body, which first slot is connected to one or more of the plurality of apertures, According to a sixth aspect of the present invention there is provided an acoustic well logging tool comprising:

a transmitter section;

a receiver section spaced apart from the transmitter section, and an acoustic isolator section comprising:

an isolator comprising (i) an isolator body;

(ii) a mass;

(iii) a resiliently deformable portion formed in the isolator body; and (iv) a movement limiter, formed integrally with the resiliently deformable portion, wherein each resiliently deformable portion comprises a plurality of apertures and at least one first slot formed in the or each isolator body, which first slot is connected to one or more of the plurality of apertures.

In an acoustic isolator according to aspects of the present invention, the mass, the resiliently deformable portion and the movement limiter may each be formed integrally with the isolator body.

In particular an acoustic isolator section according to the first aspect of the present invention, the movement limiter may be formed integrally with the resiliently deformable portion, or may be formed separately to the resiliently deformable portion.

The acoustic isolator forming the acoustic isolator section according to aspects of the present invention may comprise a plurality of resiliently deformable portions.

Alternatively, or in addition the isolator forming the acoustic isolator section according to aspects of the present invention may comprise a plurality of masses.

Alternatively, or in addition the isolator forming the acoustic isolator section according to aspects of the present invention may comprise a plurality of movement limiters.

The acoustic isolator section according to aspects of the invention may comprise one or more isolators.

The isolators may be formed integrally with one another to form the isolator section. Preferably, however, the isolators are formed separately from one another, and then joined together by any suitable means to form the isolator section.

When the isolator section comprises a plurality of isolators the masses are joined to one another via the resiliently deformable portions.

In general, the greater the number of isolators forming the isolator section, and therefore masses and resiliently deformable portions, the greater the efficiency of the filtering of unwanted frequencies, and therefore the greater level of isolation is achieved by means of the present invention.

In practice, the minimum number of resiliently deformable portions in an isolator section is likely to be three, and the minimum number of masses in an isolator section is likely to be two. In such an embodiment, the isolator section may comprise a single isolator only.

Preferably the isolator section may comprise ten resiliently deformable portions, nine masses and eight isolators. However, the environment in which the isolator section is to be used will determine the minimum and optimum number of isolators, resiliently deformable portions, and masses.

The plurality of apertures and at least one first slot together form a structure that approximates to a spring.

The stiffness of a resiliently deformable portion is determined by, for example, the number and spacings of the apertures, the size of the apertures, the thickness of the isolator body and the number and size of the at least one first slot forming the resiliently deformable portion.

The width of the first slots may vary according to the conditions to which the isolator section will be subjected. For most purposes, the width of the first slots is likely to be within the range of 0.1 mm to 5 mm, and optimally 0.3 mm. Similarly the apertures can be any size suitable for the prevailing conditions, but generally will have a size between 2 mm and 20 mm diameter, optimally 5 mm.

Preferably, each movement limiter comprises a second slot formed in the or each isolator body.

Conveniently each second slot is formed integrally with one or more resiliently deformable portions, and preferably each first slot is connected to a second slot.

In other words, each first slot forming a resiliently deformable portion is connected to a second slot to form a continuous slot.

Advantageously, each movement limiter comprises a pair of interlocking lobes formed in the or each isolator body.

In embodiments of the invention in which each movement limiter comprises a second slot, the second slot is shaped to form the interlocking lobes.

During use of the isolator section, flexure of the body portion of a well logging tool incorporating the acoustic isolator section, beyond predetermined limits will result in the portion of the second slot forming the interlocking lobes closing thus preventing further movement of the tool.

Because each second slot is shaped to form interlocking lobes, deformation of the or each isolator body in substantially any direction will be limited by the movement limiter.

The width and orientation of the second slot determines the limit of deflection of the or each isolator body in any particular direction. The second slot could be between 0.1 mm and 2 mm wide, but is optimally 0.3 mm wide.

Preferably, the masses are formed integrally with the isolator body. Alternatively, however, they may be formed separately therefrom.

When the masses are formed separately from an isolator body, they may be formed from a different material to that from which the isolator body is formed, which different material may be of a lower cost and/or higher density than the material used to form the isolator body.

The masses may be formed from any suitable material such as stainless steel, aluminium bronze, tungsten alloy or lead.

The mass of each of the masses and the stiffness of each of the resiliently deformable portions is selected in order to minimise the transmission frequencies around the 2 KHz tool operating frequency.

By means of the present invention, acoustic signals travelling directly along a well logging tool within a particular frequency range may be substantially or completely filtered out before reaching the receiving section of the tool. This is because the portion of the body of the tool caused to oscillate by virtue of the transmitter section being mounted in it, is separated from a first mass by a first resiliently deformable portion. The resiliently deformable portion deforms allowing relative movement between the tool body, and a first mass. The resiliently deformable portion is of low stiffness so that the deflection due to the relative movement causes only a small oscillating force to be applied to the first mass. The oscillation of the first mass is thus significantly smaller than the oscillation of the tool body.

The first resiliently deformable portion and the first mass form a first pair; further pairs of resiliently deformable portions and masses further reduce the amplitude of the oscillation so that the vibration is either completely or substantially filtered out before any acoustic energy reaches the receiving section having travelled through the tool.

The weight of the masses, and the stiffness of the resiliently deformable portions are therefore designed to ensure that acoustic energy within a given frequency range is not transmitted along the acoustic isolator.

The movement limiters restrict relative movement of the masses by restricting deformation of the resiliently deformable portions. This means that the forces that the resiliently deformable portions have to withstand are reduced so that the portions are not required to be of high strength.

In a situation where only tensile forces are present, the resiliently deformable portions may be required to withstand forces of up to 5 kN depending on the design of the tool and the prevailing conditions. The movement limiters will bear any forces in excess of this maximum force. The minimum required tensile strength for the isolator section will vary depending on the design of the tool and the prevailing conditions but may, be 50 kN.

The movement limiters thus prevent further deformation of the or each isolator body under overload conditions when forces exerted on the or each body would otherwise result in failure of the isolator.

Under non-overload conditions, the resiliently deformable portions may deflect in any direction, providing isolation from one or more modes of acoustic energy within a predetermined frequency band.

In embodiments of the invention where each of the movement limiters and each of the resiliently deformable portions are formed integrally with an isolator body, the complexity and cost of an acoustic isolator according to the present invention is reduced, and reliability is increase, compared to known isolators.

In a well-logging tool according to aspects of the present invention, the acoustic isolator section is preferably positioned between the transmitter section and the receiver section of the well-logging tool.

An acoustic well logging tool according to the fourth, fifth or sixth aspect of the present invention preferably comprises one or more transmitters that are dipole transmitters for transmitting acoustic signals to a surrounding bore hole formation.

Alternatively, or in addition, the transmitter section may comprise one or more monopole transmitters for transmitting acoustic signals to a surrounding bore hole formation.

Advantageously, the well logging tool comprises a plurality of transmitters and a plurality of receivers.

The invention will now be further described by way of example only with reference to the accompanying drawings in which:

FIG. 4 is a schematic representation of a second embodiment of an acoustic isolator section according to the present invention;

FIG. 5 is a cross-sectional representation of the isolator section of FIG. 4;

Figure 1:
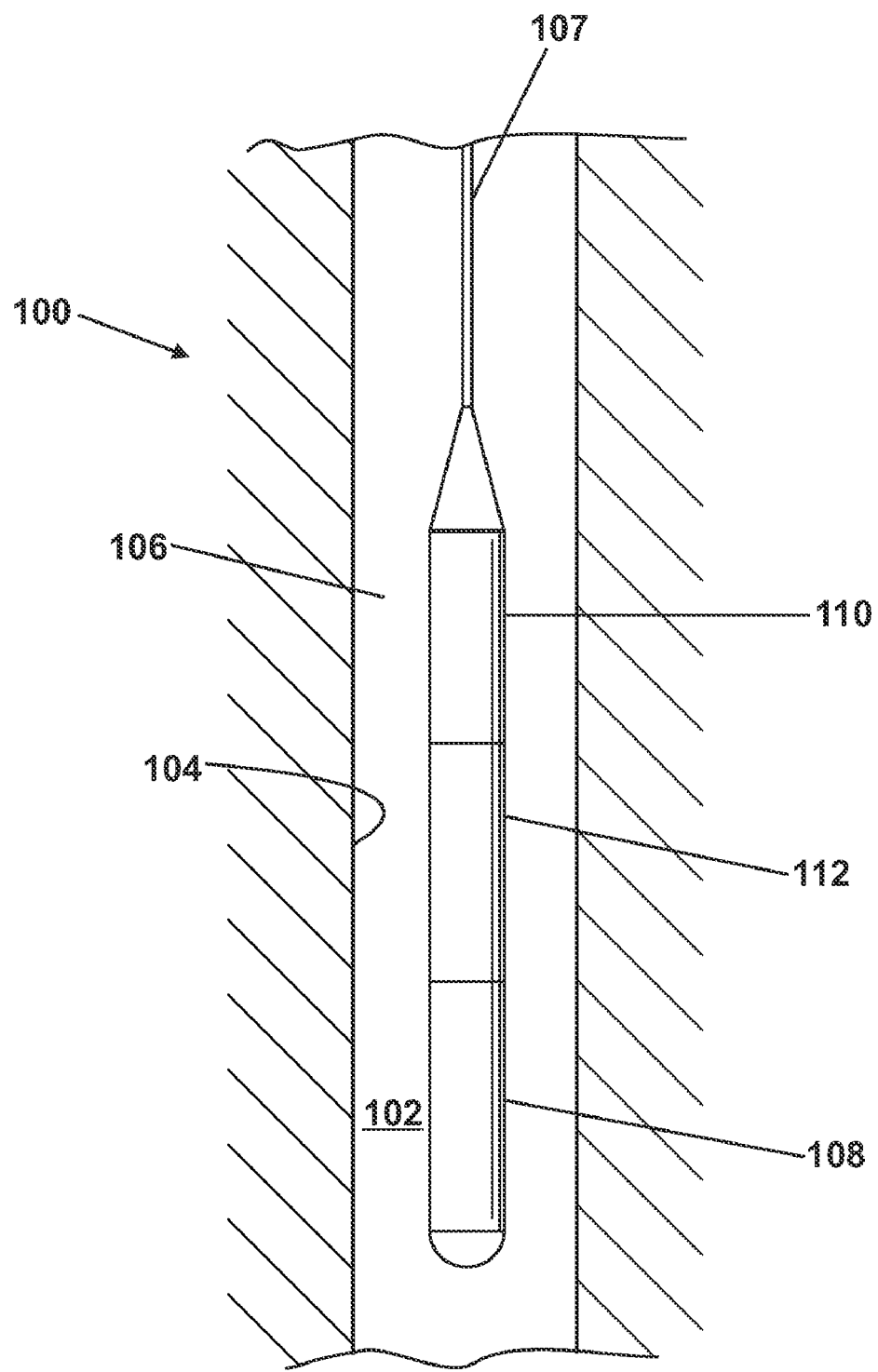
FIG. 1 is a schematic representation of an acoustic well logging tool according to an embodiment of the invention.

Referring to FIG. 1, an acoustic well logging tool according to an embodiment of the present invention is designated generally by the reference numeral 100. The logging tool 100 is shown positioned within a bore hole 102 defined by a bore hole wall 104 and containing bore hole fluid 106. The logging tool 100 may be positioned within the bore hole 102 by a wire line 107 or other suitable deployment means. The logging tool 100 comprises a transmitter section 108, and a receiver section 110. Positioned between the transmitter section 108 and the receiver section 110 is an acoustic isolator section 112 according to an embodiment of the present invention.

Different embodiments of an acoustic isolator according to the present invention will now be further described with reference to FIGS. 2 to 9. Each of the described acoustic isolator sections is suitable for incorporation into the acoustic logging tool 100.

Figure 2:
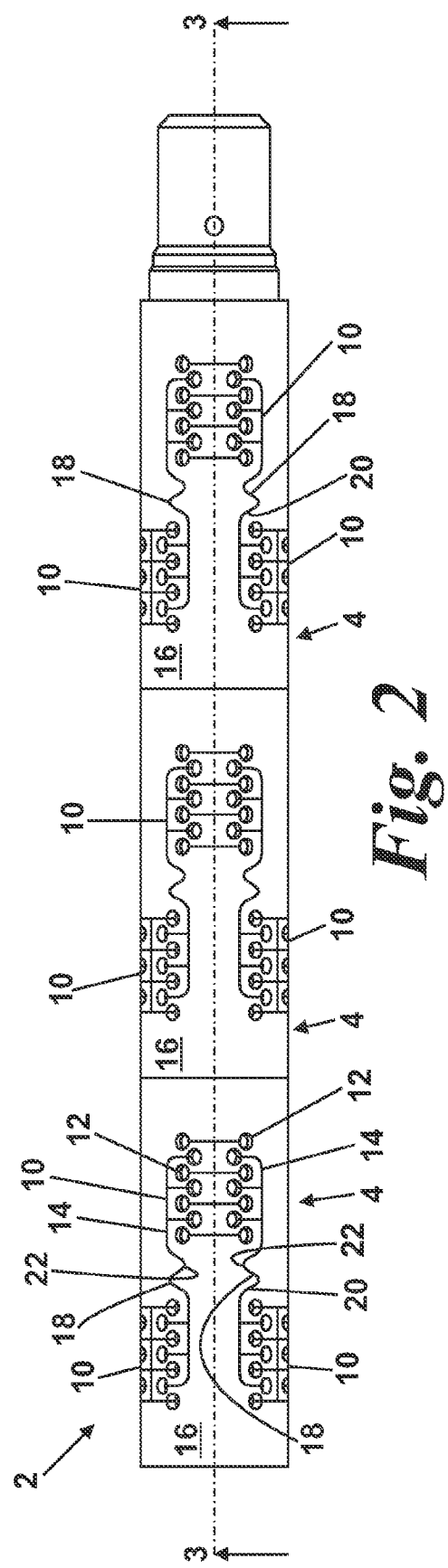
FIG. 2 is a schematic representation of an acoustic isolator section according to a first embodiment of the present invention forming part of the acoustic well logging tool of FIG. 1.
Figure 3:
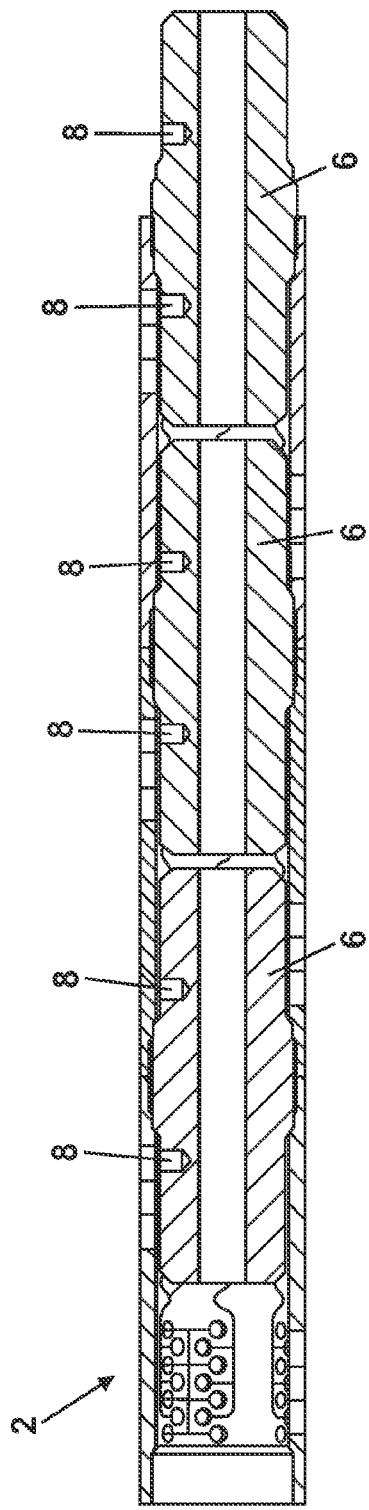
FIG. 3 is a cross-sectional representation of the isolator section of FIG. 2.

Referring to FIGS. 2 and 3, a first embodiment of an acoustic isolator section according to the present invention is designated generally by the reference numeral 2. The acoustic isolator section 2 comprises a plurality of isolators 4. As explained hereinabove the acoustic isolator section 2 forms part of an acoustic well logging tool 100.

Each isolator 4 comprises an isolator body 16 and a mass 6. The isolator section 2 therefore comprises a plurality of masses 6, which masses 6 are formed separately from the isolator bodies 16. Each of the masses 6 is connected to a first isolator body portion 16 and to a second, adjacent isolator body portion 16 by any convenient means. The isolators 4 are thus joined together by the masses.

In this embodiment, the masses are made from a different material to that used for the isolator bodies 16. This means that the masses can be made from a lower cost and/or higher density material than that used for the isolator bodies 16.

The isolator bodies 16 may be formed from any suitable material but preferably are formed from a high strength stainless steel tube. The masses 6 may be made from any suitable material but preferably are made from aluminium bronze.

Each isolator 4 further comprises a plurality of resiliently deformable portions 10 formed in the isolator body 16. The resiliently deformable portions are axially and circumferentially spaced along the isolator body 16 of each isolator. In this embodiment, each of the resiliently deformable portions 10 comprises a plurality of apertures 12 formed in each body 16 of each isolator 4, and a plurality of first slots 14 each of which is connected to at least one aperture 12. The apertures 12, together with slots 14, each form respective resiliently deformable portions 10 which, in this embodiment are in the form of spring elements.

The resiliently deformable portions 10 may be formed in the body of each of the isolators 4 by any convenient means such as by laser cutting, wire erosion, EDM, water jet cutting, fabricating, milling or casting.

Each isolator 4 further comprises movement limiters 18 formed from one or more second slots 20.

The second slots 20 are each shaped to form a pair of interlocking lobes 22. Each interlocking lobe is formed integrally with one or more resiliently deformable portions 10.

Each isolator body 16 is therefore formed as a single component comprising resiliently deformable portions 10, body portions 16 and movement limiters 18. This minimises assembly complexity and cost. In addition such a configuration enhances reliability within a small space.

When the isolator section 2 and hence a well logging tool 100 in which the isolator section is incorporated, is subjected to loads above a certain level whether in tension, compression, torsion, or bending, the portion of the second slots 20 forming a pair of interlocking lobes 22 will close, so that edges of a slot 20 defining lobes will meet, thus preventing further deformation of the resiliently deformable portions.

In this embodiment, each movement limiter is shaped as a pair of interlocking lobes 22, and therefore further deformation of the isolator section 2 in substantially any direction will be prevented.

The more isolators 4 forming the isolator section 2, the greater the level of isolation achieved. In the illustrated embodiment, there are, three isolators 4 each comprising a mass and an isolator body incorporating twelve resiliently deformable portions.

Under non-overload conditions, the resiliently deformable portions 10 may deflect in any direction, isolating all modes of acoustic energy within the predetermined frequency band.

The effectiveness of the acoustic isolator section 2 is sub-optimal under overload conditions. However under normal operating conditions it is unlikely that the tool would be subjected to such overload conditions.

In a simplified situation, where only one mode of vibration is present, the resiliently deformable portions 10 will have multiple resonant frequencies below a cut off frequency. These modes allow the transmission of vibration energy at those frequencies along the isolator.

The cut off frequency can, for this simplified case, be calculated as being equal to:

$$\frac{1}{2\pi} \cdot \sqrt{\frac{k}{m}}$$

where k is the stiffness of the resiliently deformable portions and m is the mass of the masses.

In the embodiment illustrated in FIGS. 2 and 3 for a situation where there is axial vibration only, the combined stiffness of the thirty-six resiliently deformable portions 10 is equal to:

$$k=15.5\times10^6 \, N/m$$

and the effective mass of each mass 6, m=2.3 kg.

In this embodiment therefore, the cut off frequency may be calculated as 826 Hz, which is well below the tool operating frequency of approximately 2 kHz.

At high frequency, the masses 6 may cease to behave as rigid, allowing the transmission of vibrational energy. An indication of the frequency at which this might occur is the resonant frequency of the masses 6.

In the embodiment illustrated in FIGS. 2 and 3, the first resonant frequency of the masses is at 7.1 kHz, which is above the tool operating frequency.

In practice, the resonant frequencies of the resiliently deformable portions 10 and the masses 6 may be found by calculation, test or modelling. Resonant modes other than those described may exist within the isolator section 2, but which do not allow transmission of energy along the isolator. These will generally result in part, but not all of the isolator vibrating.

EXAMPLE

Isolator Body
Length 150 mm
Outer diameter 57 mm
Wall thickness 5.5 mm
Twelve resiliently deformable portions in parallel
Slot width 0.3 mm
Material high strength stainless steel.
Masses
    Each mass has the following characteristics:
Outer diameter 44 mm (at the ends)
Length 145 mm
Mass 1.5 kg
Material aluminium bronze.

Turning now to FIGS. 4 and 5, a second embodiment of an acoustic isolator section according to the present invention is designated generally by the reference numeral 30. Parts of the isolator section 30 that correspond to parts of the isolator section 2 have been given corresponding reference numerals for ease of reference.

In this embodiment, the resiliently deformable portions 10 have a shorter simpler configuration, and the masses 6 are formed integrally with the isolator bodies 16. The isolator section 30 comprises fewer interlocking lobes 20 and resiliently deformable portions 10. In this example there are four resiliently deformable portions 10 and eight interlocking lobes in each isolator 4. This reduced number of resiliently deformable portions means that the bodies 16 of the isolators 4 must be thicker than those of isolator section 2 shown in FIGS. 2 and 3 to accommodate similar loads.

EXAMPLE

Isolator Body with Integral Mass
Length 185 mm
Outer diameter 57 mm
Body wall thickness 13.5 mm
Four resiliently deformable portions positioned in parallel
Slot width 0.3 mm
Mass of a combined isolator mass 2.7 kg
Material: high strength stainless steel.

Figure 6:
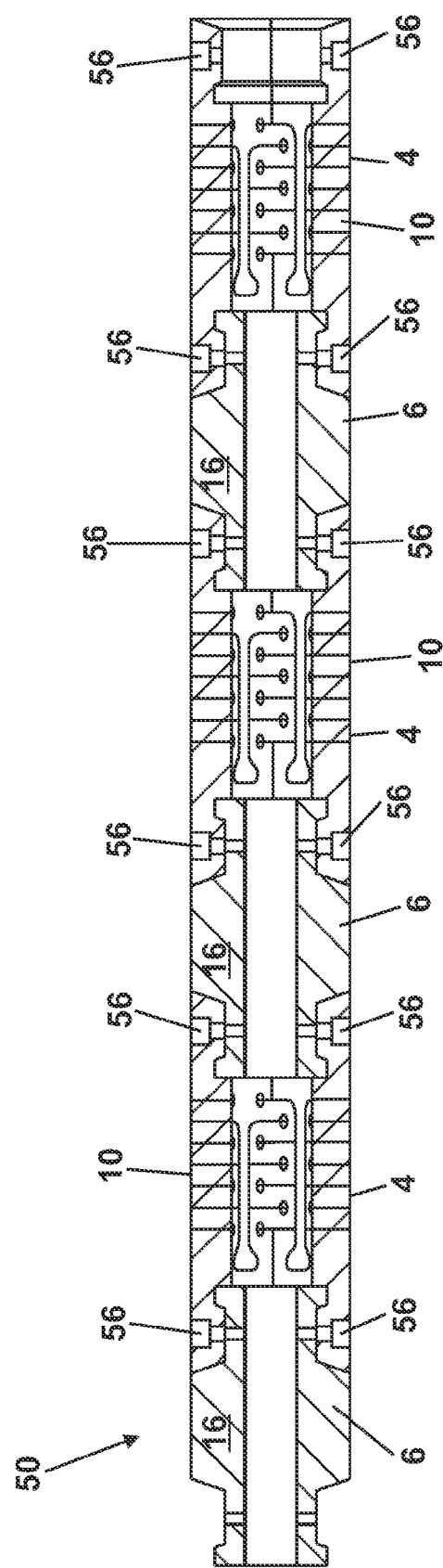
FIG. 6 is a schematic cross-sectional representation of a third embodiment of an acoustic isolator section according to the present invention.
Figure 7:
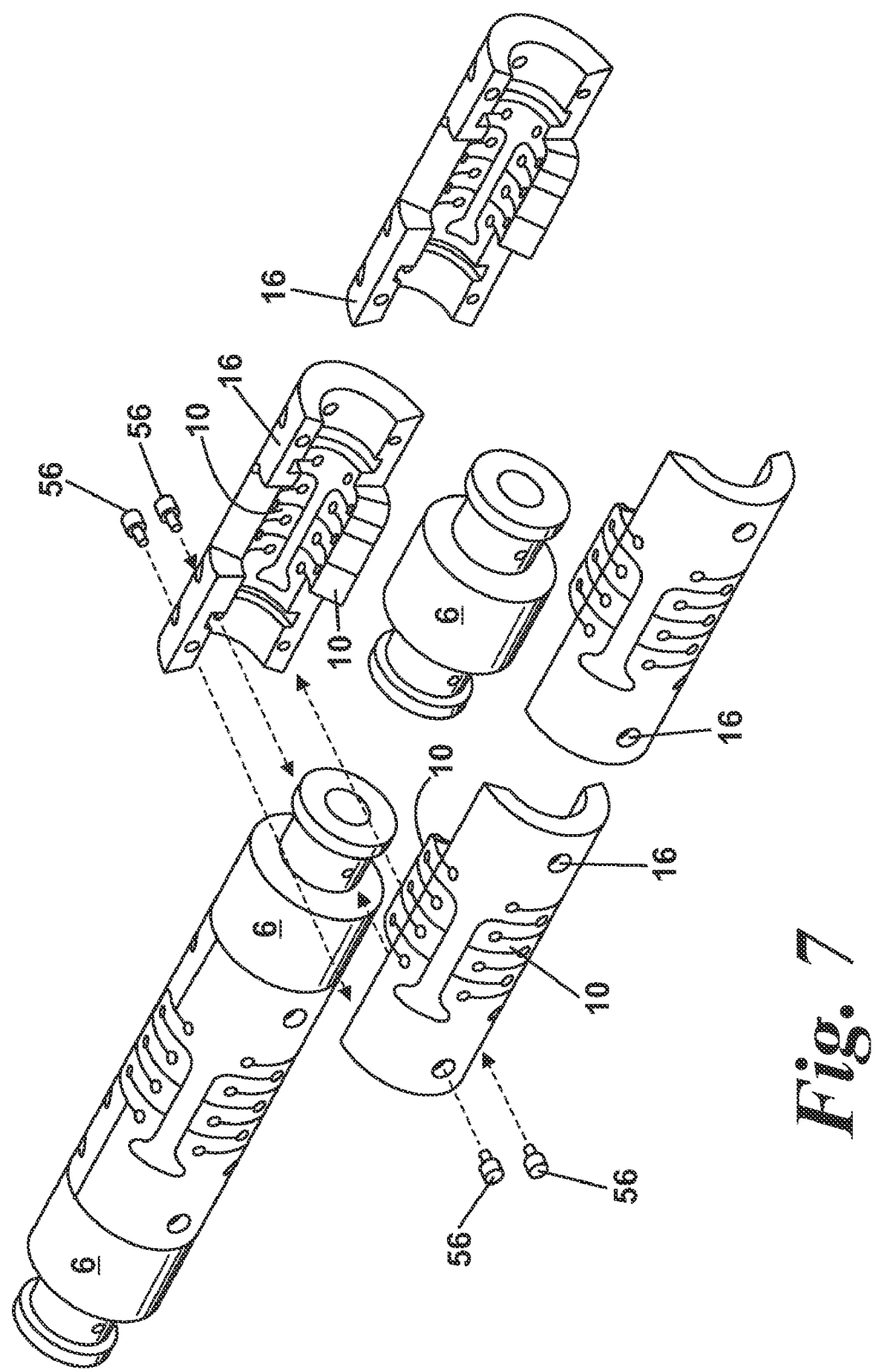
FIG. 7 is an exploded view of the isolator section of FIG. 6.

Turning now to FIGS. 6 and 7, an isolator section according to a third embodiment of the present invention is designated generally by the reference numeral 50.

Parts of the acoustic isolator section 50 that correspond to parts of the acoustic isolator section 2 illustrated in FIGS. 2 and 3 have been given corresponding reference numerals for ease of reference.

Isolator section 50 is formed with separate masses 6 in a similar manner to isolator section 2 illustrated in FIGS. 2 and 3. The design of the resiliently deformable portions 10 in isolator section 50 corresponds to the design of the resiliently deformable portions 10 of isolator section 30 illustrated in FIGS. 4 and 5.

The isolator section 50 comprises three isolators 4 which are split axially to form two half shells. The half shells are clamped onto the masses 6 by means of screws 56. They do not, therefore, have to be screwed on, as is the case with the embodiment shown in FIGS. 2 and 3. It is therefore not necessary to rotate parts of the isolator section 50 when assembling the isolator section as is required when it is necessary to engage a screw thread as is the case in the embodiment shown in FIGS. 1 and 2.

This means that the angular alignment between the ends of the isolator section 50 is not variable. This is not the case when screw threads are used to attach masses 6 to the isolator bodies 16. In the case of dipole acoustic logging tools it is necessary to properly align a receiver section positioned at one end of the isolator section to a transmitter section positioned at an opposite end of the isolator section, since both the receiver section and the transmitter section are directional.

Figure 8:
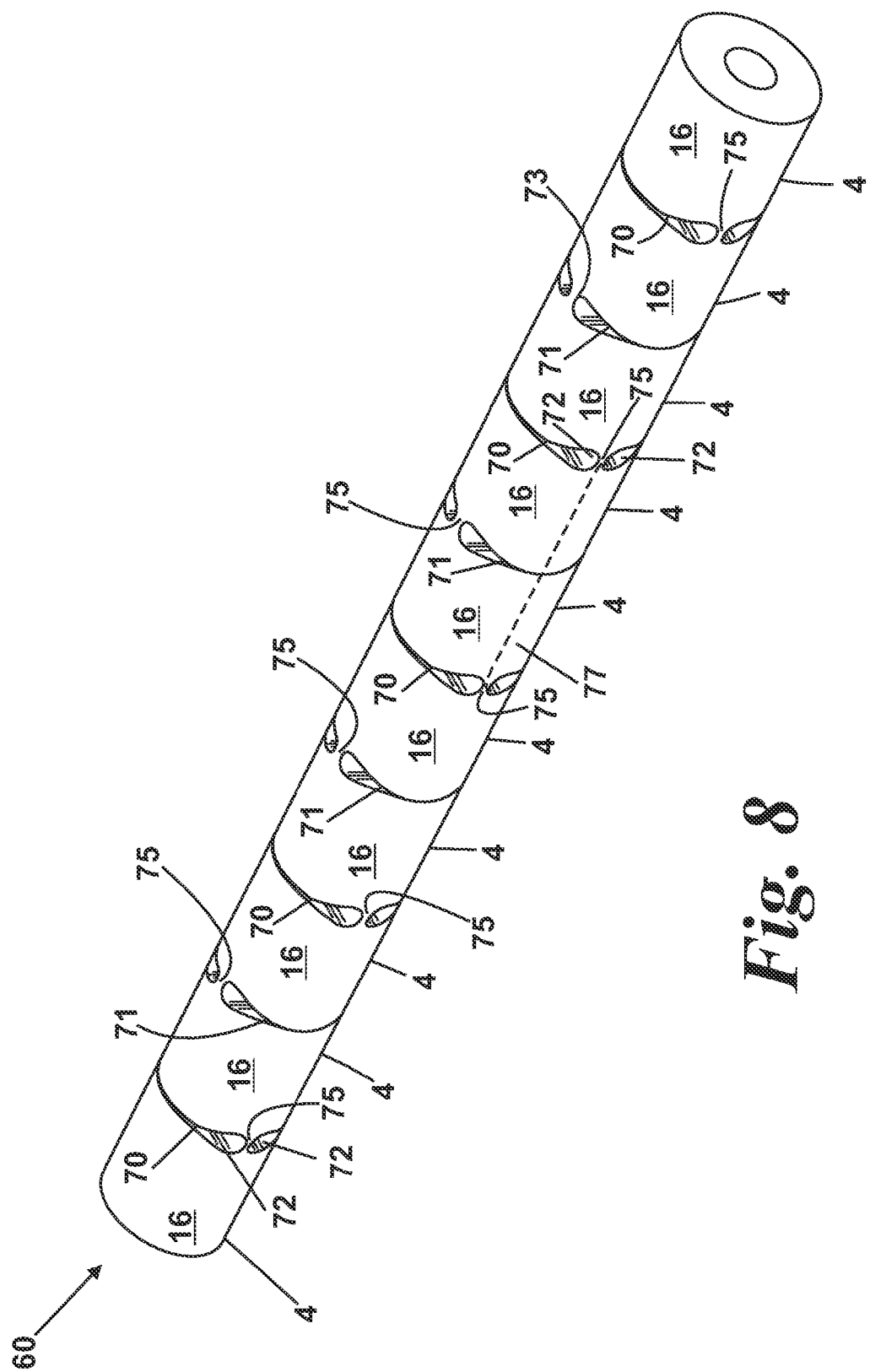
FIG. 8 is a schematic representation of a fourth embodiment of an acoustic isolator section according to the present invention.
Figure 9:
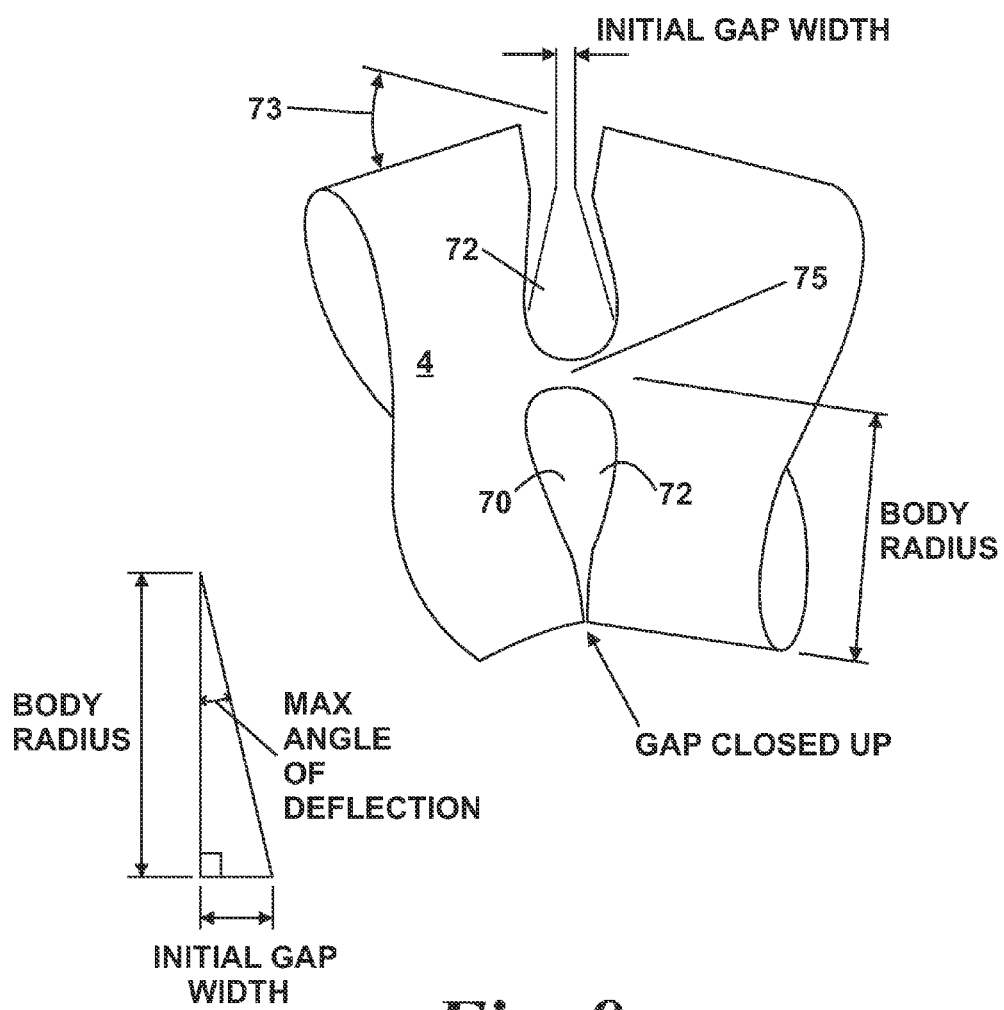
FIG. 9 is a detailed representation of a portion of the isolator section of FIG. 8 showing maximum deflection of the isolator body.

An isolator section according to a forth embodiment of the present invention is illustrated in FIGS. 8 and 9 and is designated generally by the reference numeral 60. Parts of the isolator section 60 that correspond to parts of the isolator section 2 have been given corresponding reference numerals for ease of reference.

This embodiment of the invention is suitable for use in conditions where a transmitter forming part of a tool 100 incorporating the isolator section 60 transmits transverse energy rather than longitudinal acoustic energy.

The isolator section 60 is preferably formed from a high strength stainless steel.

The isolator section 60 comprises a plurality of isolators 4. In this embodiment of the invention, one or more masses are formed integrally with each isolator body 16, and thus there is no separate mass attached to any of the isolator bodies 16.

The isolator section 60 further comprises two sets of resiliently deformable portions 70, 71 shown in more detail in FIG. 9. Each of the resiliently deformable portions 70, 71 comprises a hinge 75 which may be resiliently deformable or elastic for example, and which is defined between slots 72 which act as movement limiters. The first set of resiliently deformable portions 70 is offset by 90° from the second set of resiliently deformable portions 71. This allows the isolator section 60 to flex in any direction.

The outer diameter of the isolator section 60 shown in FIG. 8 is 57 mm. There is a 20 mm diameter bore through the isolator section 60 to allow wires to pass through the isolator for use in a well logging tool incorporating the isolator. The distance between adjacent hinges in the same set (70; 71) is designated by the reference numeral 77. In this example distance 77 is 120 mm.

Each hinge 70, 71 is 5 mm thick, and each slot 72 is 0.5 mm wide in an undeflected state. This dimension is known as the initial gap width, which controls the maximum deflection, as shown in FIG. 9. The maximum angle of deflection is identified by the reference numeral 73.

The maximum angle of defection, 73, is defined as $$\operatorname{Tan}^{-1}\left(\frac{\text{initial gap}}{\text{radius 75 of isolator 60}}\right)$$

As can be seen from FIG. 9, movement of the isolator section 60 will be prevented once the slots 72 close.

Figure 10:
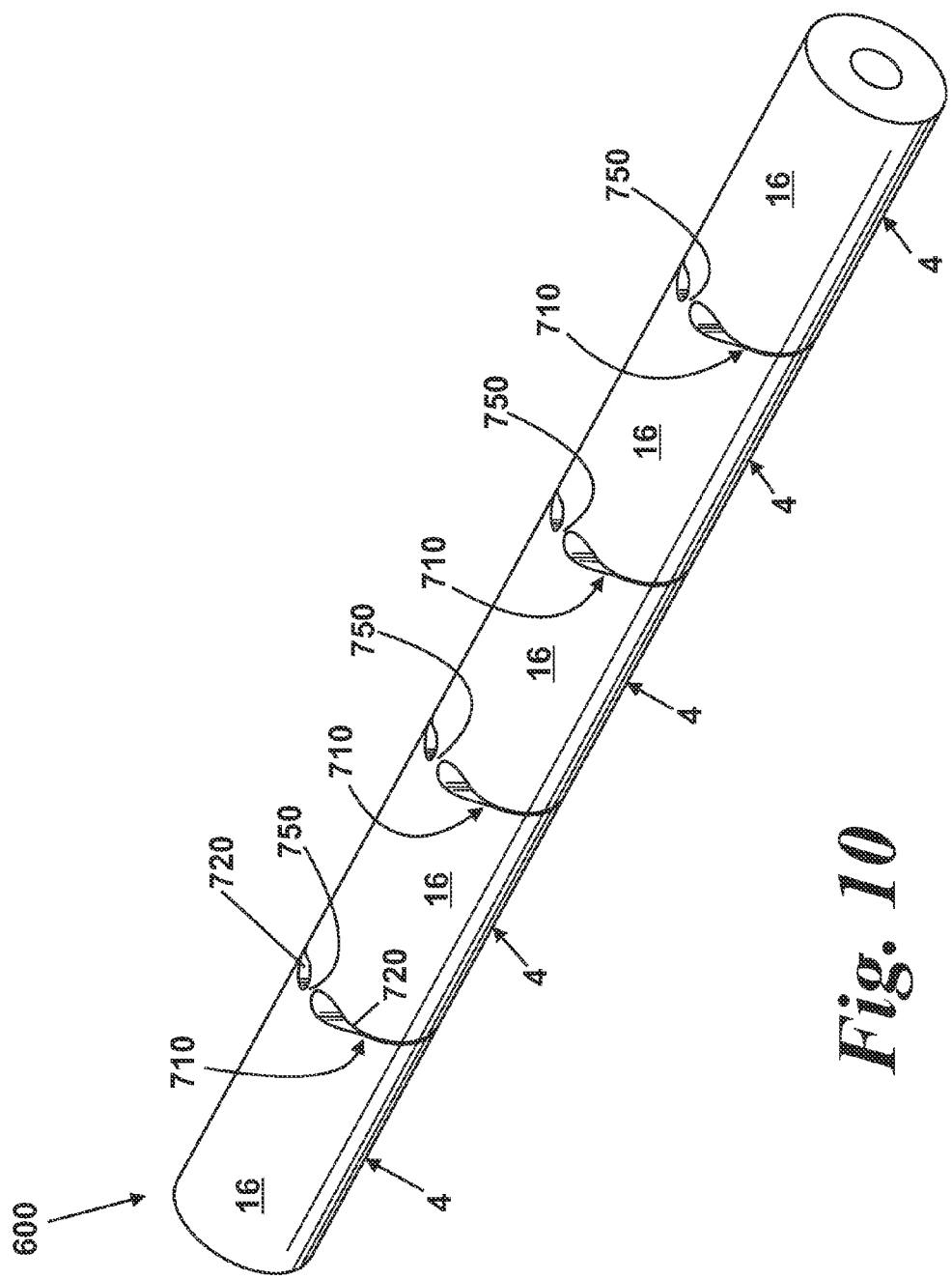
FIG. 10 is a schematic representation of a fifth embodiment of an acoustic isolator section according to the present invention.

Turning now to FIG. 10, a fifth embodiment of the present invention is shown. This embodiment comprises an isolator section 600 comprising a single set of resiliently deformable portions 710 that each comprise a hinge 750. The hinges 750 may each be resiliently deformable, or elastic, for example and are each defined between slots 720. The resiliently deformable portions 710 allow the isolator 600 to flex laterally, and the slots 720 serve to limit movement of the isolator section 600.

Beyond a predetermined deflection, the slots 710 will close preventing further bending.

This embodiment of the invention is suitable for use in conditions where a transmitter forming part of a tool 100 incorporating the isolator 600 transmits transverse acoustic energy in a single direction only and no longitudinal acoustic energy.

The invention claimed is:

1. An acoustic isolator section for an acoustic well logging tool, the isolator section comprising:
    an isolator comprising:
    (i) an isolator body;
    (ii) a mass;
    (iii) a resiliently deformable portion formed integrally with the isolator body;
    (iv) a movement limiter,
    wherein each resiliently deformable portion comprises a plurality of apertures and at least one first slot formed in the or each isolator body, which first slot is connected to one or more of the plurality of apertures, wherein each movement limiter comprises a second slot formed in the or each isolator body, and wherein each first slot is connected to a second slot.

2. An acoustic isolator section for an acoustic well logging tool, the isolator section comprising:
    an isolator comprising:
    (i) an isolator body;
    (ii) a mass;
    (iii) a resiliently deformable portion;
    (iv) a movement limiter formed integrally with the isolator body,
    wherein each resiliently deformable portion comprises a plurality of apertures, and at least one first slot formed in the or each isolator body, which first slot is connected to one or more of the plurality of apertures, wherein each movement limiter comprises a second slot formed in the or each isolator body, and wherein each first slot is connected to a second slot.

3. An acoustic isolator section for an acoustic well logging tool the isolator section comprising
    an acoustic isolator comprising:
    (i) an isolator body;
    (ii) a mass;
    (iii) a resiliently deformable portion formed in the isolator body; and
    (iv) a movement limiter, formed integrally with the resiliently deformable portion,
    wherein each resiliently deformable portion comprises a plurality of apertures, and at least one first slot formed in the or each isolator body, which first slot is connected to one or more of the plurality of apertures, wherein each movement limiter comprises a second slot formed in the or each isolator body, and wherein each first slot is connected to a second slot.

4. An acoustic isolator section for an acoustic well logging tool, the isolator section comprising:
    an isolator comprising:
    (i) an isolator body;
    (ii) a mass;

(iii) a resiliently deformable portion formed integrally with the isolator body;
(iv) a movement limiter,
wherein each resiliently deformable portion comprises a plurality of apertures and at least one first slot formed in the or each isolator body, which first slot is connected to one or more of the plurality of apertures, wherein each movement limiter comprises a pair of interlocking lobes formed in the or each isolator body.

5. An acoustic isolator section for an acoustic well logging tool, the isolator section comprising:
an isolator comprising:
(i) an isolator body;
(ii) a mass;
(iii) a resiliently deformable portion;
(iv) a movement limiter formed integrally with the isolator body,
wherein each resiliently deformable portion comprises a plurality of apertures, and at least one first slot formed in the or each isolator body, which first slot is connected to one or more of the plurality of apertures, wherein each movement limiter comprises a pair of interlocking lobes formed in the or each isolator body.

6. An acoustic isolator section for an acoustic well logging tool the isolator section comprising
an acoustic isolator comprising:
(i) an isolator body;
(ii) a mass;
(iii) a resiliently deformable portion formed in the isolator body; and
(iv) a movement limiter, formed integrally with the resiliently deformable portion,
wherein each resiliently deformable portion comprises a plurality of apertures, and at least one first slot formed in the or each isolator body, which first slot is connected to one or more of the plurality of apertures, wherein each movement limiter comprises a pair of interlocking lobes formed in the or each isolator body.

7. An acoustic isolator section according to any claims 1 to 3 or claims 4 to 6 wherein the mass, the resiliently deformable portion and the movement limiter are each formed integrally with the isolator body.

8. An acoustic isolator section according to any of claims 1 to 3 or claims 4 to 6 wherein the isolator comprises a plurality of resiliently deformable portions.

9. An acoustic isolator section according to any of claims 1 to 3 or claims 4 to 6 wherein the isolator comprises a plurality of masses.

10. An acoustic isolator section according to any of claims 1 to 3 or claims 4 to 6 wherein the isolator comprises a plurality of movement limiters.

11. An acoustic isolator section according to any of claims 1 to 3 or claims 4 to 6 comprising a plurality of isolators.

12. An acoustic isolator section according to any of claims 1 to 3 or claims 4 to 6 comprising a plurality of isolators, wherein the isolators are integrally formed with one another.

13. An acoustic isolator section according to any of claims 1 to 3 or claims 4 to 6 comprising a plurality of isolators, wherein the resiliently deformable portions are joined via the masses.

14. An acoustic isolator section according to any of claims 1 to 3 or claims 4 to 6 wherein each movement limiter comprises a second slot formed in the or each isolator body.

15. An acoustic isolator section according to any one of claims 1 to 3 or claims 4 to 6 wherein the isolator includes a plurality of masses that are formed separately from one another.

16. An isolator forming part of an acoustic isolator section according to any of claims 1 to 3 or claims 4 to 6.

17. An acoustic well logging tool having a tool body portion and comprising:
a transmitter section located on the tool body portion;
a receiver section located on the tool body portion, and spaced apart from the transmitter section, and
an acoustic isolator section according to any of claims 1 to 3 or claims 4 to 6.

18. An acoustic well logging tool having a tool body portion and comprising:
a transmitter section located on the tool body portion;
a receiver section located on the tool body portion, and spaced apart from the transmitter section, and
an acoustic isolator section according to any one of claims 1 to 3 or claims 4 to 6,
wherein the acoustic isolator section is positioned between the transmitter section and the receiver section.

19. An acoustic well logging tool having a tool body portion and comprising:
a transmitter section located on the tool body portion;
a receiver section located on the tool body portion, and spaced apart from the transmitter section, and
an acoustic isolator section according to any one of claims 1 to 3 or claims 4 to 6,
wherein the transmitter section comprises one or more dipole transmitters for transmitting acoustic signals to a surrounding borehole formation.

20. An acoustic well logging tool having a tool body portion and comprising:
a transmitter section located on the tool body portion;
a receiver section located on the tool body portion, and spaced apart from the transmitter section, and
an acoustic isolator section according to any one of claims 1 to 3 or claims 4 to 6,
wherein the transmitter section comprises one or more monopole transmitters.

21. An acoustic well logging tool having a tool body portion and comprising:
a transmitter section located on the tool body portion;
a receiver section located on the tool body portion, and spaced apart from the transmitter section, and
an acoustic isolator section according to any one of claims 1 to 3 or claims 4 to 6,
comprising a plurality of transmitters and a plurality of receivers.

22. An acoustic well logging tool having a tool body portion and comprising:
a transmitter section located on the tool body portion;
a receiver section located on the tool body portion, and spaced apart from the transmitter section, and
an acoustic isolator section according to any one of claims 1 to 3 or claims 4 to 6,
comprising a plurality of isolators each including a plurality of masses positioned between receivers in the receiver section.

* * * * *